March 10, 1953  B. AMES  2,631,216

COOKING APPARATUS

Filed Aug. 13, 1948  5 Sheets-Sheet 1

Inventor
Butler Ames
by Roberts Cushman & Grover
Att'ys

March 10, 1953 B. AMES 2,631,216
COOKING APPARATUS
Filed Aug. 13, 1948 5 Sheets-Sheet 2

Inventor
Butler Ames
by Roberts Cushman Crown
Att'ys.

March 10, 1953 B. AMES 2,631,216
COOKING APPARATUS
Filed Aug. 13, 1948 5 Sheets-Sheet 3

Inventor
Butler Ames
By Roberts Cushman Grover
Att'ys.

March 10, 1953  B. AMES  2,631,216
COOKING APPARATUS
Filed Aug. 13, 1948  5 Sheets-Sheet 4
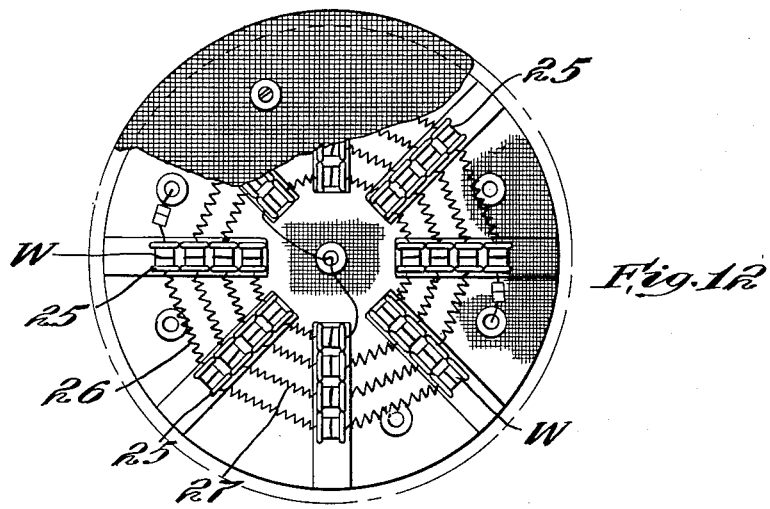
Fig.12
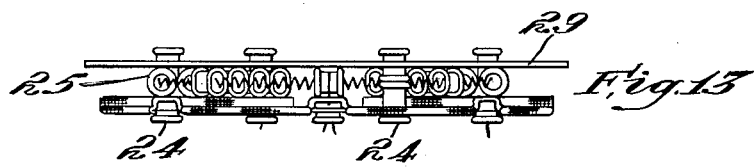
Fig.13
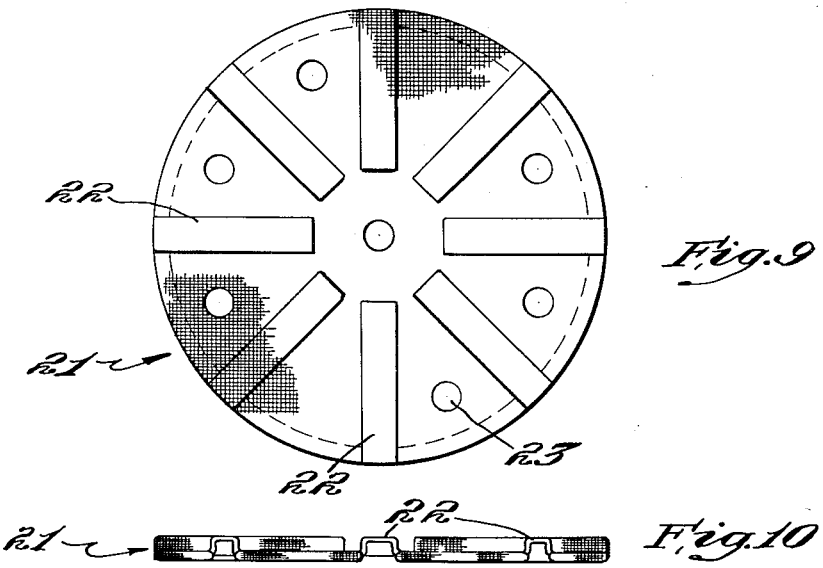
Fig.9
Fig.10
Inventor
Butler Ames
by Roberts Cushman & Grove
Att'ys.

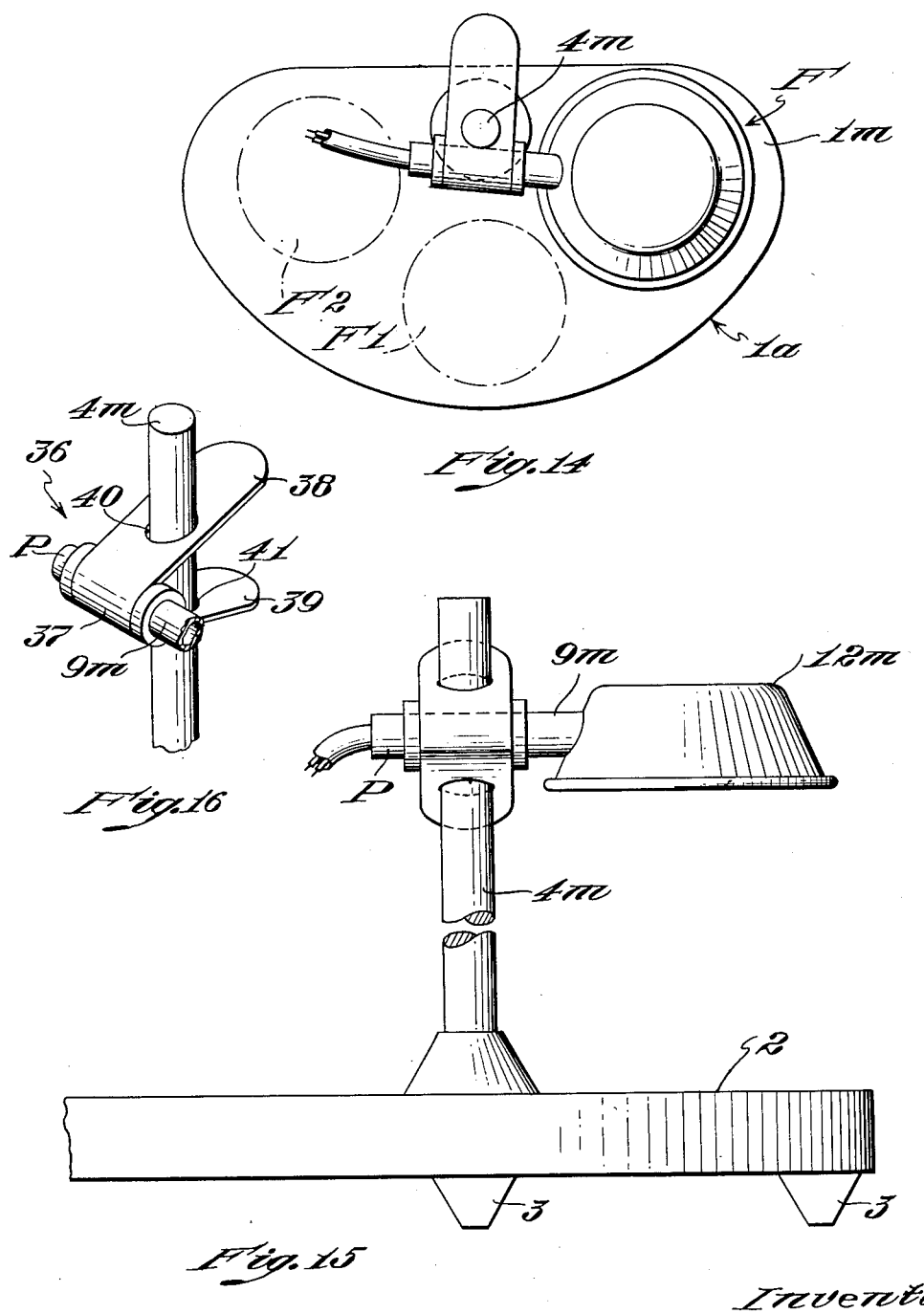

Patented Mar. 10, 1953

2,631,216

UNITED STATES PATENT OFFICE 2,631,216

COOKING APPARATUS

Butler Ames, Boston, Mass.

Application August 13, 1948, Serial No. 44,200

6 Claims. (Cl. 219—34)

This invention relates to electrical cooking and heating apparatus, and more especially to a portable stove designed to be connected into an electrical circuit, the present invention constituting an improvement upon that which is disclosed in my copending application for Letters Patent, Serial No. 38,399, filed July 13, 1948.

One object of the invention is to provide a very simple, economical and inexpensive cooker and heater comprising very few parts but which is capable of cooking according to every known process.

A further object is to provide a cooker by means of which food may be cooked in a new way and with resultant improved flavor, to provide a cooker and heater such that the current is utilized so efficiently as to reduce the cooking time and thus reduce expense, and whereby the evolution of smoke and odor during cooking is almost entirely eliminated. A further object is to provide a cooker wherein cooking may be carried on in the open and in full sight of the cook but without evolution of noticeable odor and without spattering grease. A further object is to provide a heating device capable of use alternatively for cooking food or as a room heater and capable of supplying several degrees of heat.

A further object is to provide a cooker having a heat-radiating element which is capable of quick and simple adjustment so as, at will, to direct the heat radiations downwardly, for example, for broiling, roasting or toasting, or to direct the heat upwardly, for example, for boiling or frying. A further object is to provide a cooker having provision for supporting and adjusting the heat source to different distances from the article being cooked.

A further object is to provide a cooker in which the food, for example, bacon, may be observed during the entire cooking operation but without substantial evolution of fumes or outward spattering of grease.

Other and further objects and advantages of the invention will be pointed out in the following more detailed description and by reference to the accompanying drawings wherein:

Fig. 9 is a plan view of a carrier disk on which the heating elements are mounted;

Fig. 10 is an edge view of the disk of Fig. 9;

Fig. 12 is a plan view of the disk of Fig. 9 showing the resistant coils mounted thereon;

Fig. 13 is a side elevation showing the disks of Figs. 9 and 11, respectively, with the heating element interposed between them;

Fig. 14 is a plan view showing a modification;

Fig. 15 is a fragmentary side elevation of the device of Fig. 14; and

Fig. 16 is a perspective view of a retaining clip.

Figure 1:
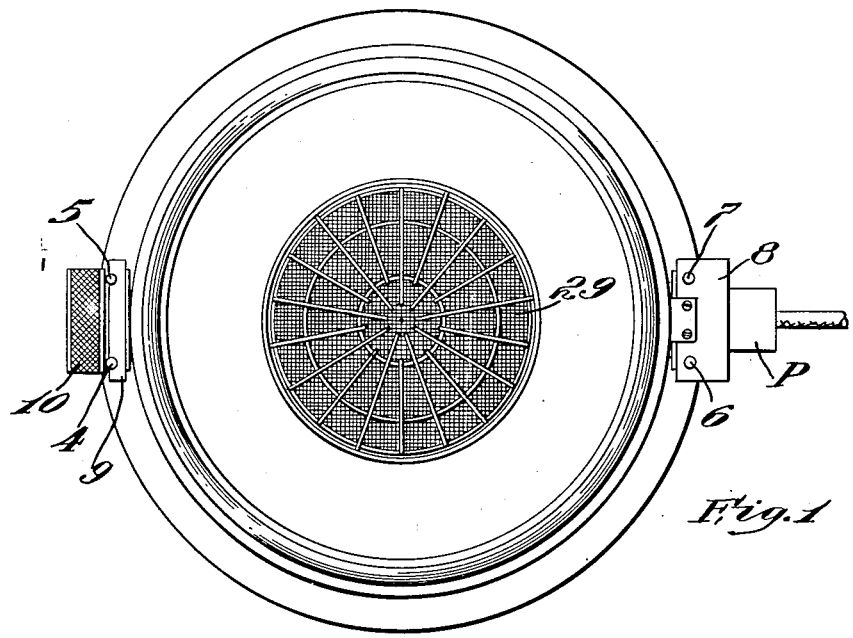
Fig. 1 is a plan view of the improved cooker with the heating unit arranged to deliver radiant heat upwardly.

Referring to the drawings, the improved cooker of the present invention comprises a rigid base 1 here shown as circular, preferably of metal, for example, stainless steel having a smooth and horizontal upper surface 2. This surface 2 may be used as a support for food to be cooked, for instance, to hold bread for toasting, or a griddle for baking pancakes, or to hold bacon or sausages for broiling, or, alternatively, as a support for utensils within or on which the food is placed.

Figure 2:
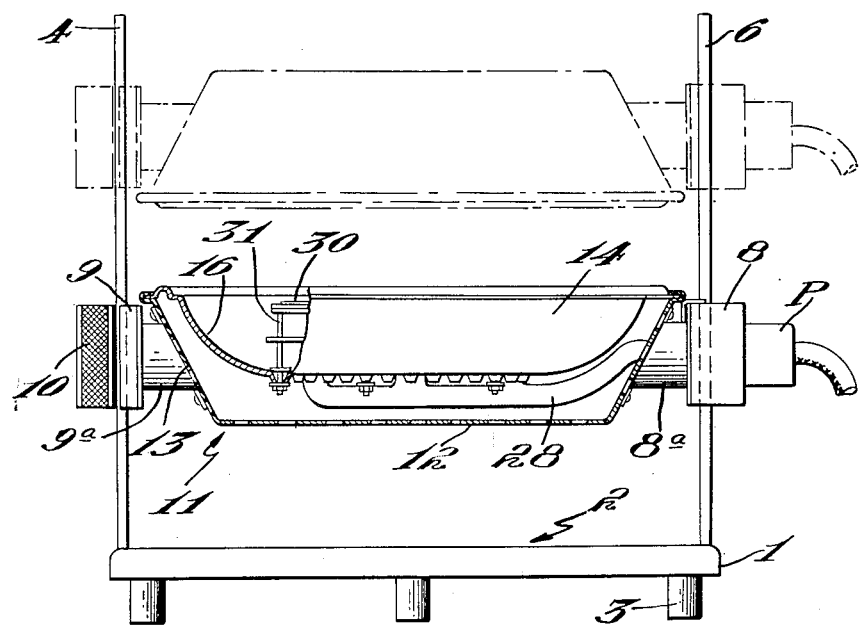
Fig. 2 is a side elevation of the cooker of Fig. 1, partly in vertical section, and also indicating in broken lines how the heating element may be arranged to deliver radiant heat downwardly.

Preferably, this base is made of sheet metal and has a downturned, smoothly rounded marginal flange to stiffen it and impart a finished appearance. As illustrated in Fig. 2, this base is carried by legs 3. Four legs are desirable, although three legs may be sufficient to provide the desired support. Preferably, these legs are of some insulating material, for example, a synthetic resin. The legs have screw-threaded axial bores which receive threaded stainless steel studs fixed to the underside of the base. By turning the legs relatively to the studs, the upper surface 2 of the base may be adjusted to horizontal position even though the legs rest upon an uneven surface.

As shown in Figs. 1 to 6, vertical guides are arranged at diametrically opposite sides of the base. While guides of other type may be employed, for example, guides formed from sheet metal or tubular stock, each of the guides, as here illustrated, comprises a pair of parallel posts or rods 4, 5 and 6, 7, respectively. These posts or rods are of rigid metal, preferably stainless steel, and securely fixed at their lower ends to the base 1. A block 8 (Fig. 2) of insulating material, having parallel vertical bores which receive the rods 6 and 7 with a sliding fit, is so arranged as to be adjustable up and down along the guide constituted by the rods 6 and 7. Preferably, this block 8 is shaped to constitute an electrical receptacle designed to receive a plug P at the end of a conductor cord.

A block 9 is arranged for adjustment along the guide constituted by the posts or rods 4 and 5. This block 9 has parallel grooves in its left-hand face for the reception of the rods, and is provided with a horizontal, internally screw-threaded bore for the reception of a screw 10 having a knurled head whose flat right-hand face is designed to engage the rods 4 and 5. By tightening the screw, the block 9 may be clamped to the rods 4 and 5 at any desired height. In the alternative arrangement, shown in Figs. 14 to 16 and hereafter more fully described, a single guide is employed for supporting the heating unit.

The heating unit and reflector are carried by a support or basket 11 having a substantially flat bottom 12 and an upwardly sloping side wall 13. Preferably, this basket or support is made of perforated metal, preferably stainless steel. Whether or not the entire support or basket is of perforated material, the bottom 12 should be provided with perforations or openings.

Hollow, axially aligned trunnions 8ª and 9ª are secured to the side wall 13 of the basket at diametrically opposite points. These trunnions are arranged to turn on circular bosses fixed to the blocks 8 and 9, respectively, the parts being so arranged that the basket or casing 13 may turn through an angle of at least 180°.

By loosening the screw 10, the blocks 8 and 9 may be adjusted up and down along the vertical guides so that the bracket 11 may be disposed at any desired height. While the screw 10 is thus loosened, the basket may be turned about the axes of the trunnions 8ª and 9ª so that it may occupy the upright position as shown in full lines in Fig. 2 or the inverted position shown in broken lines in Fig. 2, or at any intermediate position. When properly adjusted, the basket may be secured in adjusted position by tightening the screw 10. Within the basket 11 there is arranged the reflector 14 within which the heating elements are secured. The reflector 14 is basin-like in shape, having the bottom 15 which is preferably slightly convexed upwardly. The reflector has the curved side wall 16 which terminates in a flange 17 which rests upon and is preferably interlocked with the marginal flange of the basket 11. The reflector 14 is preferably of stainless steel or other material which will reflect radiant energy and which will not be injured by exposure to heat radiations. The curved wall 16 may be of circular or parabolic curvature so designed as to reflect radiations which move outwardly from the heat source in a generally horizontal direction. The bottom 15 of the reflector 14 is provided with a plurality of downwardly punched tits 18 defining apertures through which gas or vapors may pass. The bottom 15 also has upwardly directed bosses 19 having substantially horizontal upper surfaces and central apertures 20.

A carrier disk 21 (Figs. 9 and 10) is mounted upon the bosses 19. This disk 21 is of open mesh material, for instance, woven stainless steel wire or wire of other material which is resistant to high temperatures, for example, temperatures approximating 1800° F. As illustrated in Figs. 9 and 10, this disk 21 has a plurality of radial upwardly directed ribs 22, and holes 23 which are designed to be registered with the holes 20 with the bosses 19 of the support 14.

Spool-like sleeves or grommets 24 are fixed in the holes 23 of the disk 21 and rest on the top of the bosses 19 to which they are secured in any desired way, for example, by bolts passing axially through the grommets.

Each of the ribs 22 constitutes an elevated support for a series of grommets or spool-like sleeves 25 of porcelain or other refractory material which is resistant to heat and a good electrical insulator. Thus grommets 25 are arranged with their axes substantially perpendicular to the mid-radius of the rib 22 on which they rest. The grommets are secured to the ribs by wrappings of fine, heat resistant wire W which passes about the barrel of the grommet between its heads and through the meshes of the disk 21, the wires being tied or twisted so as to hold the grommets firmly in place.

These grommets constitute insulating supports for resistant coils 26 and 27, the wires forming the coils passing through the axial bores in the grommets. The terminals of the coils 26 and 27 pass downwardly through convenient ones of the grommets 24 and are connected to insulating leads housed in a tubular conduit 28 (Fig. 2) located between the bottoms of the parts 11 and 14. The insulated leads pass into the receptacle 8 and terminate at posts (not shown) designed to enter corresponding sockets in a plug P attached to the end of the flexible conductor cord. Preferably the posts and sockets are so arranged that by properly entering the plug into the receptacle, one or the other or both of the coils 26 and 27 may be supplied with current. The coils 26 and 27 are of different heating capacities and thus at least three heats are available.

Before assembling the resistant coils 26 and 27 with the disk 21, the latter together with the grommets 25 and their attaching wires W are sprayed with Alundum cement or other similarly refractory material which covers the individual wires forming the disk 21 as well as the grommets and their attaching wires W but which does not completely close the mesh openings of the disk. The disk is then baked at a temperature approximating 1800° F. thereby to vitrify the cement.

Figure 11:
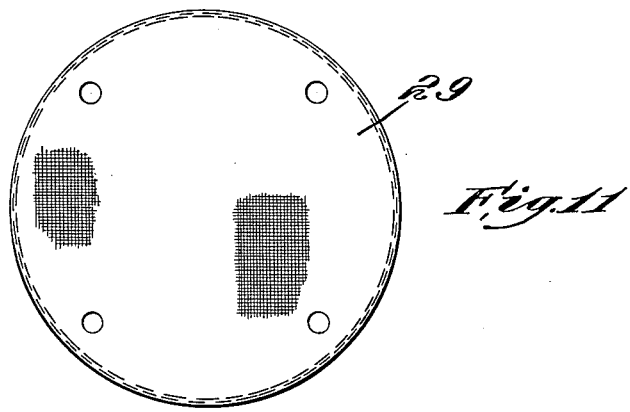
Fig. 11 is a plan view of a protective disk which overlies the heating elements.

Preferably a protective disk 29 (Fig. 11) (not coated with Alundum) of heat resistant wire mesh is mounted just above the heating coils 26 and 27 resting upon the heads of the grommets 25 and being secured in position by appropriate means, for instance, screws or wire wrappings. This disk 29 protects the heating elements from mechanical injury and from direct contact with other parts.

Above the disk 29 there is arranged a wire grid 30 (Figs. 1 and 2) having legs 31 whose lower ends are fixed to but insulated from the reflector 14. The grid 30 is preferably of stainless steel and rigid and strong enough to support cooking utensils above the heating unit. This grid is spaced from the wire mesh disks 21 and 29 so that there is no direct conduction of heat from these disks to the grid.

Figure 3:
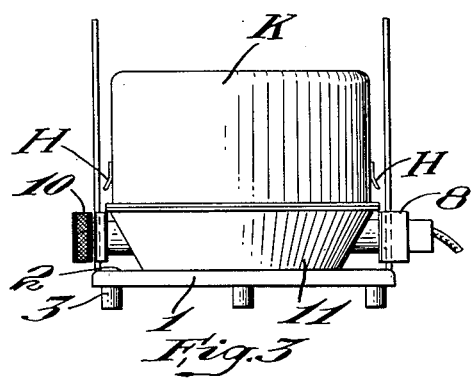
Fig. 3 is a side elevation to smaller scale showing the cooker arranged for baking or steaming.

As illustrated in Figs. 1, 2, 3 and 4 the heating unit is so positioned that the heat radiations are for the most part directed upwardly. In Fig. 3 the basket 11 is shown as lowered so as to rest directly upon the upper surface 2 of the base 1. A kettle K (Fig. 3) of conventional type, preferably of aluminum, is disposed in inverted position directly above the heating unit with its rim resting upon the flange 17 of the reflector 14. As shown, the kettle K has handles H, which are preferably of stainless steel. When thus positioned the kettle defines the side and top walls of an oven space within which baking, steaming, etc. may be carried on, the radiation from the heating unit doing the cooking.

Figure 4:
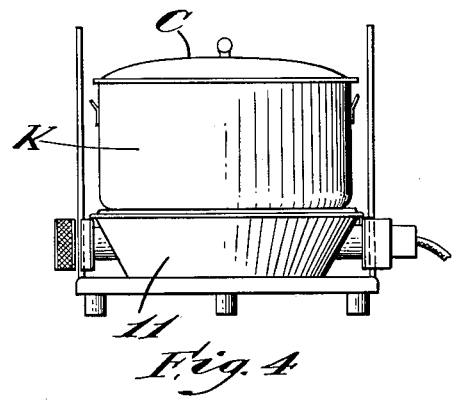
Fig. 4 is a side elevation of the cooker arranged for boiling.

In Fig. 4 the casing 11 is shown in the same position as in Fig. 3, but the kettle K is arranged upright, its bottom resting upon the grid 30. As thus arranged, the kettle K may be used for boiling, stewing, deep frying, etc. In this view the kettle K is shown as provided with its usual cover C. Instead of the kettle K any other usual cooking utensil may be employed, for example, a frying pan, sauce pan or the like adapted to the particular cooking process involved.

Figure 5:
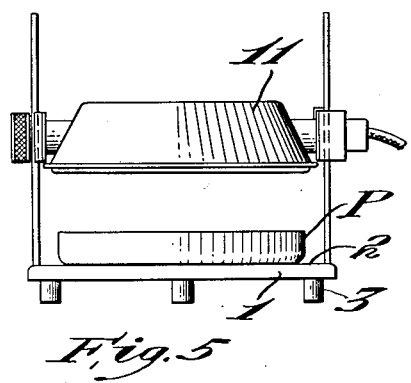
Fig. 5 is a side elevation of the cooker arranged for open-air broiling or toasting.

In Fig. 5 the basket 11 is shown in elevated position, spaced from the surface 2 of the base 1 and inverted so that the greater portion of the heat radiations from the source are directed downwardly. When so positioned, the cooker is useful for toasting or broiling. Articles to be toasted or broiled may be laid directly upon the upper surface 2 of the base if desired. When toasting, the slices of bread may be positioned by hand and may readily be turned by hand even without the assistance of a fork, for although the radiations are intense the fingers are not harmed when turning the toast. For broiling or grilling, it may be desirable to place the food to be cooked in a dish or pan resting on the base. A grid or rack may be placed directly upon the surface 2, or in a pan, or arranged to rest upon the upper edge of the pan. Instead of a shallow pan P, as shown in Fig. 5, a deep receptacle such as the kettle K may be employed, and the basket 11 may be adjusted so as to rest on the upper edge of the kettle K, thus forming a closed chamber in which the food is subjected to heat directed downwardly.

Cooking with the parts arranged as shown in Fig. 5, that is to say with the heating unit spaced vertically above the food, appears to involve a new principle. The cooking takes place in the open, making it possible for the cook to observe the progress of the operation. Cooking takes place in an atmosphere free from smoke or fumes (which, when present, act as a barrier to the radiant energy) so that the energy emitted from the source is highly effective. There is no lateral spattering of grease or the evolution of visible smoke or perceptible odor. Such particles of grease as are expelled from the food when the heat is unduly intense can be seen to be drawn upwardly toward the heat source and are volatilized and do not escape laterally. The vaporous products of cooking move upwardly into direct contact with the very hot surfaces of the heating unit and are thereby reduced to less complex, invisible and odorless forms. The openings in the reflector 14 and in the bottom of the basket 11 permit the upward flow of air and vapors, so that there is an updraft which tends to bring all fumes and fluid particles emitted from the food into intimate contact with the heat source. This upward flow of air also helps to keep the support and casing reasonably cool.

Referring to Figs. 14 to 16, inclusive, an alternative construction is illustrated wherein the support or basket which carries the heating unit is supported by a single post and is capable of being swung in a horizontal plane in addition to its capability of vertical movement and rotation. In this arrangement, the base 1$^a$ is of more or less elliptical contour, having the substantially smooth, horizontal upper surface 2 useful, if desired, as a cooking surface and having the supporting legs 3. A single rigid post 4$^m$ is affixed to the base, preferably at a point near the rear edge of the base and approximately midway of its longer diameter. The basket 12$^m$, which supports the heating unit, may be of substantially the same construction as the basket 12 above described except that it is provided with but a single trunnion 9$^m$. This trunnion is hollow to provide for the passage of the electrical conductor, and has a socket P at its end for the reception of a plug at the end of the conductor cord.

The peripheral surface of the trunnion 9$^m$ is placed in tangential contact (Fig. 14) with the post 4$^m$ and is held in adjusted position relatively to the post by a spring clip 36. This clip is substantially U-shaped or hairpin-like in shape, comprising the bend 37 and the substantially parallel legs 38 and 39. These legs have the aligned openings 40 and 41 designed to receive the post 4$^m$. The clip is first applied to the trunnion 9$^m$ so that the latter is embraced in the bend 37 of the clip. The clip is then slipped over the post 4$^m$ by compressing the legs 38 and 39 between the thumb and finger so that the legs are brought more nearly into parallelism, in which position the holes 40 and 41 may be threaded over the post 4$^m$. When the legs 38 and 39 are released, they tend to spring apart, thus causing the edges of the openings 40 and 41 to bite against the rod 4$^m$ so as securely to hold the parts in place. By pressing the legs 38 and 39 toward each other, the grip of the clip may be released sufficiently to permit the basket 12$^m$ to be turned about the horizontal axis of the trunnion so that the heat energy may be directed up or down as desired. Likewise, by pressing the legs of the clip toward each other, the basket may be adjusted up or down along the post to different distances from the surface 2. Further, if desired, the basket may be swung in a horizontal plane so as to occupy positions such as indicated at F, F1, F2, as shown in Fig. 14. Thus, the heat source may be disposed as desired relatively to the base, for example, so that cooking may take place over one part of the base while utensils holding food in course of preparation are positioned on another part of the base in readiness for the application of heat energy.

Figure 6:
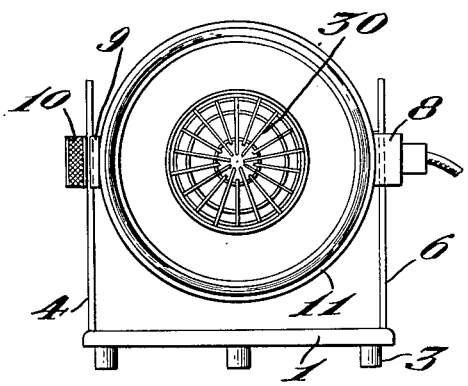
Fig. 6 is a side elevation showing the device of Fig. 1 adjusted for new heating.
Figure 7:
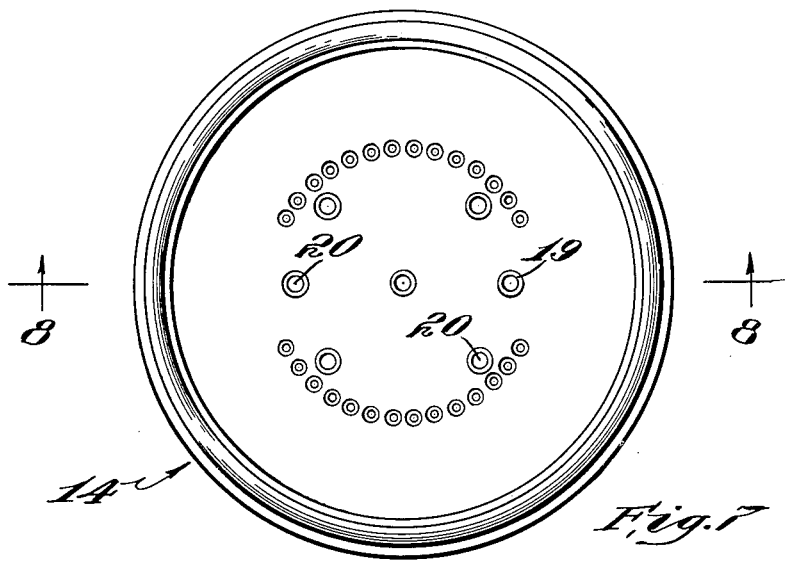
Fig. 7 is a plan view of the reflector which houses the heating unit.
Figure 8:
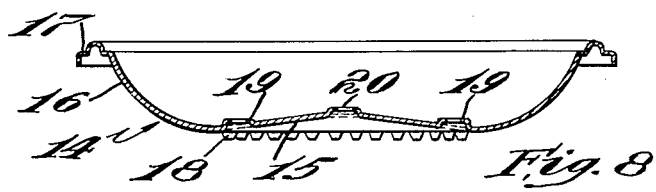
Fig. 8 is a diametric section on the line 8—8 of Fig. 7.

In Fig. 6 the device is shown arranged for space heating, the basket being turned to a position such that the radiations from the source are substantially horizontal. By raising or lowering the basket 11 and by turning it to different angles, the radiations may be directed as desired for the most effective distribution and heating of the surroundings.

While certain desirable embodiments of the invention have been shown and described, it is to be understood that the invention is broadly inclusive of any and all modifications falling within the scope of the appended claims.

I claim:

1. An electrically energized cooker comprising a base, two pairs of spaced vertical posts having their lower ends fixed to the base, each pair constituting a guide, a block slidable vertically along each guide, a basket-like support of perforated sheet metal connected to the respective blocks whereby the basket-like support is adjustable vertically relatively to the base, a concave reflector arranged within the basket and with its peripheral portion secured to the basket, a heat source arranged within the reflector at the axis of the latter, a grid arranged within the reflector above the heat source, and means for supplying electrical current to the heat source.

2. An electrically energized cooker having a substantially circular rigid base, a vertical rigid guide disposed at each end respectively of a diameter of the base, a basket-like support of perforated sheet metal arranged between said guides, vertically slidable members associated with the respective guides for holding the support at selected distances from the base, a basin-like reflector of stainless steel mounted in and fixed to the support, a source of radiant energy disposed within the reflector, a conduit arranged between the bottom of the reflector and the bottom of the base, insulated leads within the conduit for supplying electrical current to the source, and a grid disposed above the source, the grid being fixed to but insulated from the reflector.

3. An electrically energized cooker having a substantially circular rigid base, adjustable supporting legs for the base, vertical rigid guides disposed respectively at opposite ends of a diameter of the base, a basket-like support arranged between the guides, a vertically slidable block associated with each respective guide, the support having axially aligned trunnions which turn in bearings carried by the respective blocks whereby the support may be turned about a horizontal axis through an angle of at least 180°, means associated with at least one of the blocks for adjustably securing such block to its respective guide and for holding the support in desired position of angular adjustment, a concave reflector arranged within the support and fixed to the latter, a source of radiant heat energy within the reflector, means for supplying electrical energy to the source, and a grid disposed in spaced relation to said source and perpendicular to the axis of the reflector, said grid constituting a support for cooking utensils.

4. An electrically energized cooker having a substantially circular rigid base, having a horizontal and flat upper surface, vertical rigid guides disposed respectively at opposite ends of a diameter of the base, a basket-like support of perforated sheet material arranged between said posts, a vertically slidable member associated with each respective post and means for connecting the support to said vertically slidable members whereby the support may be adjusted toward and from the base, a basin-like reflector of stainless steel having a peripheral rim and means for securing said rim to the edge of the basket-like support with the bottom of the reflector spaced from the bottom of the support, a source of radiant heat energy within the reflector, a conduit arranged between the bottom of the support and the bottom of the reflector, and insulated leads within the conduit for supplying current to the source.

5. An electrically energized cooker having a substantially circular rigid base, vertical rigid guides disposed respectively at opposite ends of a diameter of the base, an inverted basket-like receptacle of perforated stainless steel arranged between the guides, an inverted basin-like reflector arranged within the support and fixed to the latter, means adjustably connecting the support to said guides whereby the support may be moved up and down relatively to the base, a heat source within the reflector, the reflector being constructed and arranged to direct energy from the source downwardly toward the base, and means for supplying electrical current to the source, the space between the lower edge of the basket-like receptacle and the base being freely open and unobstructed except by the guides.

6. An electrically energized cooker comprising a basin-like reflector of stainless steel having a smoothly curved wall operative to reflect radiations so that after reflection they are directed substantially parallel to the axis of the reflector, and a heat source within the lower part of the reflector comprising a carrier disk secured to the bottom of the reflector, said disk being of wire mesh fabric having radial upstanding ribs, spaced insulating elements fixed to the ribs, coils of electrical resistance wire mounted on the insulating supports so that they are free from contact with other parts, means for supplying energy to said coils, and a protective disk of wire mesh above and spaced from the coils, the coils so arranged emitting radiant energy in the horizontal direction for direct impingement upon the curved wall of the reflector.

BUTLER AMES.

REFERENCES CITED

The following references are of record in the file of this patent:

UNITED STATES PATENTS

| Number | Name | Date |
|---|---|---|
| 600,464 | Webster et al. | Mar. 8, 1898 |
| 732,470 | Tatham, Jr. | June 30, 1903 |
| 983,360 | Granger | Feb. 7, 1911 |
| 1,109,551 | Shoenberg | Sept. 1, 1914 |
| 1,480,787 | Serrell | Jan. 15, 1924 |
| 1,492,595 | Edmands | May 6, 1924 |
| 1,533,175 | Fahrenwald | Apr. 14, 1925 |
| 1,552,335 | Mottlau | Sept. 1, 1925 |
| 1,584,105 | Lenz | May 11, 1926 |
| 1,622,485 | Bersted et al. | Mar. 29, 1927 |
| 1,673,296 | McManus | June 12, 1928 |
| 1,743,566 | Packeritz | Jan. 14, 1930 |
| 1,860,530 | Doane | May 31, 1932 |
| 1,969,878 | Dumas | Aug. 14, 1934 |
| 2,055,972 | Fritsche | Sept. 29, 1936 |
| 2,292,255 | Weisberg | Aug. 4, 1942 |
| 2,339,974 | Austin | Jan. 25, 1944 |
| 2,417,977 | French | Mar. 25, 1947 |
| 2,446,666 | Thompson | Aug. 10, 1948 |
| 2,496,654 | Alsdorf | Feb. 7, 1950 |
| 2,508,357 | Ames | May 23, 1950 |
| 2,555,668 | Ames | June 5, 1951 |
| 2,581,343 | Ames | Jan. 8, 1952 |

FOREIGN PATENTS

| Number | Country | Date |
|---|---|---|
| 20,101 | Australia | May 16, 1929 |